(12) United States Patent
Flynn

(10) Patent No.: US 9,280,362 B2
(45) Date of Patent: Mar. 8, 2016

(54) SYSTEM AND APPARATUS FOR SHARING A HOST COMPUTER

(75) Inventor: Thomas Flynn, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1491 days.

(21) Appl. No.: 12/618,776

(22) Filed: Nov. 15, 2009

(65) Prior Publication Data

US 2011/0119666 A1 May 19, 2011

(51) Int. Cl.
*G06F 13/10* (2006.01)
*G06F 9/44* (2006.01)

(52) U.S. Cl.
CPC ............ *G06F 9/4445* (2013.01); *G06F 13/102* (2013.01); *G06F 2213/0042* (2013.01); *G06F 2213/0058* (2013.01)

(58) Field of Classification Search
None
See application file for complete search history.

(56) References Cited

U.S. PATENT DOCUMENTS

| 6,601,109 | B1 | 7/2003 | Bealkowski et al. | |
|---|---|---|---|---|
| 7,012,610 | B2 * | 3/2006 | Turner et al. | 345/519 |
| 8,028,040 | B1 * | 9/2011 | Hobbs et al. | 709/219 |
| 2004/0212610 | A1 * | 10/2004 | Hamlin | 345/211 |
| 2006/0020732 | A1 * | 1/2006 | Charna | 710/303 |
| 2008/0168118 | A1 * | 7/2008 | Hickey et al. | 709/201 |
| 2008/0201414 | A1 | 8/2008 | Husain et al. | |
| 2009/0083450 | A1 | 3/2009 | Peterson | |
| 2009/0163272 | A1 | 6/2009 | Baker et al. | |
| 2010/0030853 | A1 * | 2/2010 | Lin et al. | 709/203 |
| 2010/0125692 | A1 * | 5/2010 | Lai | 710/302 |
| 2010/0205463 | A1 * | 8/2010 | Magnusson | 713/300 |
| 2011/0063315 | A1 * | 3/2011 | Ghosh | 345/536 |

OTHER PUBLICATIONS

Displaylink-DL125 Press ERlease Mar. 2009; "DisplayLink Ships Higher Performance USB Chips Delivering HD Graphics to New Samsung Lapfit Displays" Display Link press release; ww.displaylin. com/news/nes190509a.htm[Jan. 4, 2009 6:41:54pm].
Holtex HT82K95E/HT82K95A USB Multimedia Keyboard Encoder 8-BIT MCU; Dec. 22, 2008, Rev 2.20.
Displaylink Multi-Monitor made eay with USB "Monitors Made Easy with USB"; DisplayLink | 480 S. California Ave | Ste 304 | Palo Alto | CA 94306 | USATel: +1 650-838-0481 | Fax: +1 650-838-0482 | marketing@displaylink.com | www.displaylink.com.
SMSC Sucess by Design USB2514 "USB 2.0 High Speed 4-Port Hub Controller"; Revision 1/98 (Nov. 19, 2007).
SMSC 2514; http://www.mouser.com/catalog/specsheets/2514.pdf.
DisplayLink web site http://www.displaylink.com/ DL125 http://www.displaylink.com/pdf/dl_pb_125_165_195.pdf.
C-Media—CM119A; http://www.cmedia.com.tw/usb_CM119A. html reference.
Holtek HT82K95E http://www.holtek.com.tw/Chinese/docum/computer/82k95x.htm.
http://en.wikipedia.org/wiki/Remote_Desktop_Protocol http://en.wikipedia.org/wiki/Thin_client http://en.wikipedia.org/wiki/Remote_Desktop_Services.

(Continued)

*Primary Examiner* — Ilwoo Park
(74) *Attorney, Agent, or Firm* — HP Inc Patent Department

(57) ABSTRACT

A system and apparatus is disclosed for sharing a host computer. The system discloses: a set of USB cables; a set of virtualization devices, a set of USB ports on the host computer, an operating system; and a virtualization module. The apparatus discloses: a hub controller; a graphics display module; and an audio controller.

16 Claims, 3 Drawing Sheets

(56) References Cited

OTHER PUBLICATIONS

Thin-Client "Terminal Access Devices" (L and X Series); http://www.ncomputing.com/ http://ncomputing.com/Solutions/Xseries.aspx http://ncomputing.com/Lseries.aspx.

SoftXpand http://www.miniframe.com/ http://www.miniframe.com/art.asp?id=5.

http://www.engadget.com/2006/09/01/ndiyos-hubster-usb-based-thin-client/ http://www.ndiyo.org/systems/hubster/basics http://www.ndiyo.org/systems/hubster/configurable http://www.ndiyo.org/news/open-source-hubster http://www.ndiyo.org/systems/hubster/faq.

United States Patent Application 20050193396 HP USB Graphics Adapter (NL571AT) http://h10010.www1.hp.com/wwpc/us/en/sm/WF06c/A10-51210-332469-332462-332469-3913299-3913300-3913303.html.

HP USB 2.0 Docking Station (FQ834AA#xxx) http://h18000.www1.hp.com/products/quickspecs/13223_div/13223_div.HTML.

International Searching Authority. International Search Report. Mail Date Aug. 11, 2011. Application No. PCT/US2010/056741. Filing Date Nov. 15, 2010.

* cited by examiner

SYSTEM AND APPARATUS FOR SHARING A HOST COMPUTER

BACKGROUND OF THE INVENTION

1. Field of the Invention

The present invention relates generally to systems and apparatus for sharing computers.

2. Brief Background Introduction

Current computer sharing architectures are complex, non-industry standard, and costly to maintain.

BRIEF DESCRIPTION OF THE DRAWINGS

Some examples of the invention are described in the following figures.

DETAILED DESCRIPTION OF THE PREFERRED EMBODIMENT

Figure 1:
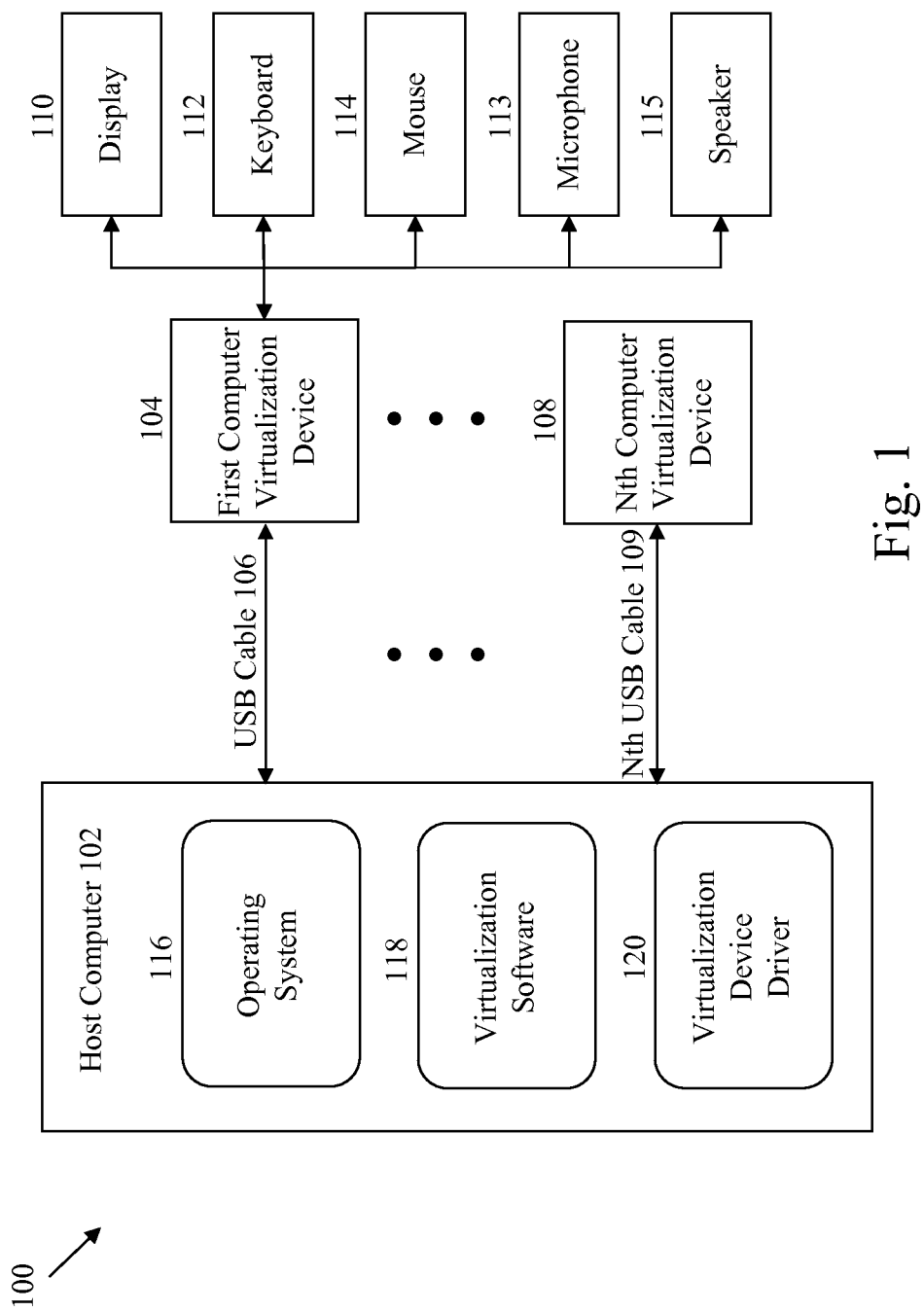
FIG. 1 is one example of a system for sharing a host computer.

Up to 6 Billion people in the world do not have Personal Computers (PCs) and neither do up to 1.2 Billion of the world's students have access to a PC. Thus there is a tremendous unmet customer need for PCs in Emerging Markets and Education. The barrier to extending PCs into these domains is typically cost.

Of those schools and emerging market areas that do have PCs, many only have 2 to 3 PCs per area, and rarely do such users have their own personal PC. In schools, since the PCs are typically shared only intermittently by the students, most teachers still view PCs as separate from the teaching and learning process and not as a tool for engaging the students in all aspects of the educational process.

Also something almost always seems to be wrong with one or more of the PCs, and the availability of an IT or system administration to show up and fix each computer is often minimal in many schools and most emerging market areas. One alternative toward a "one PC per person" topology is a "PC sharing" solution. PC sharing is a type of client-server architecture wherein one host computer is networked with and provides PC-based services to several thin-clients. Current "PC Sharing" solutions require the host computer to be opened and PCI circuit cards installed. The thin-clients then need to be Ethernet cabled to the PCI cards, and each connected to their own power source. The PCI cards themselves are non-standard and are typically not supported by the host computer's vendor, leaving the end user to diagnose any interface or other problems on their own.

Similarly the application software and drivers required in such thin-client installations interact with the host computer's Operating System (OS) in a non-standard way and are typically not supported by the host computer's operating system vendor. The Ethernet network signals are also typically proprietary and do not follow industry standard protocols. Since such non-standard solutions are unlicensed and unsupported by primary hardware and software vendors, such solutions can have unpredictable integration and effects on the host computer's OS, thus increasing IT maintenance time and costs, which schools and emerging market entities find difficult to bear.

Beyond operational considerations, the power consumption of traditional PCs is up to 250 Watts, and even most thin-client computers consume significant amounts of power, thus requiring separate power connections and higher electricity costs. Thus there is a real need for low-cost, energy-frugal, PC sharing systems and apparatus which can easily be installed, setup, used, and supported.

The present invention addresses and remedies many, if not all, of the problems discussed above, which makes it particularly useful to educational and emerging market customers. More particularly, the present invention does not require that a PCI or any other circuit card be installed on the host computer. Thus customers can avoid opening PC, thereby simplifying installation, and removing a significant user barrier to entry.

The invention also does away with Ethernet network and power supply connections, thereby yielding a significant reduction in cabling complexity, and non-industry standard, proprietary network protocols as compared to current PC sharing based architectures. Instead the invention uses standard USB cables to directly connect to any industry-standard USB port on a host computer. This allows for better and simpler expandability just by adding more industry-standard USB ports to the host computer. No specialized hardware or PCI circuit cards are required. The USB interface permits additional instances of the invention to be added one at a time, instead of 3, 4, 5, etc at a time in those systems which require PCI cards to be installed.

The invention is also USB-only powered, thereby further eliminating power cords and a need for supplemental power supplies at the installation site. A unique set of hardware components were selected for the invention so that a user could be presented with a remote display, keyboard, mouse, microphone, and speaker interface, while still being USB-only powered. USB power also insures that the present invention's power consumption is far below the up to 250 Watts required of a separate PC and some thin-clients.

The invention also uses industry-standard hardware and software interfaces to enable easy plug-and-play installation and automatic setup. Thus users can expand instances of the host computer for sharing with other users without requiring an IT specialist's support. The present invention's simplicity also enables the invention to be embodied in a very low cost device.

Details of the present invention are now discussed.

FIG. 1 is one example of a system 100 for sharing a host computer 102. The host computer 102 can be a server, a personal computer (PC) or any other computing device. The host computer 102 includes a set of USB ports, which accept a set of USB cables.

The host computer 102 is coupled to a first virtualization device 104 with a USB cable 106 connected to one of the USB ports on the host computer 102. The host computer 102 is also optionally coupled to a set of additional virtualization devices, such as the Nth virtualization device 108, with additional USB cables, such as the Nth USB cable 109, connected to the other USB ports on the host computer 102. Each of the virtualization devices 104, 108 requires only one B-type-USB cable connection to a USB port on the host computer 102. Current USB cables can be up to 5 meters in length without requiring additional power.

The first virtualization device 104 is itself coupled to a display 110, a keyboard 112, a microphone 113, a mouse 114, and a speaker 115 using a set of connection cables. One example set of cables is further discussed below. The display 110 requires its own separate power cord.

The host computer 102 includes an Operating System (OS) 116, virtualization module 118, and a virtualization device driver 120. The OS 116 can be of any type (e.g. Microsoft, Linux, Apple, etc.).

The virtualization module 118 (a.k.a. "PC-sharing" module) in one example is an augmented version of Microsoft Corporation's "Remote Desktop Protocol (RDP)" application software. The virtualization module 118 enables a unique session/instance of the OS 116 to be created for each virtualization device 104, 108 connected to the host computer 102.

However, since the virtualization devices 104, 108 are connected to the host computer 102 with USB cables 106, 109 using a USB protocol, instead of Ethernet protocol, the virtualization module 118 creates a special simulated network which enables the RDP application in the virtualization module 118 to address each of the virtualization devices 104, 108 as if they were connected using a Ethernet network. This simulated network permits additional virtualization devices, such as the Nth virtualization device 108, to be USB connected to the host computer 102 and yet each have their own instance of the OS 116 using the RDP application.

One example of a way to create this simulated network is by interfacing the RDP application with Microsoft's "Virtual Network Interface (VNI)" application, using a loop-back network stack in Microsoft's Windows Server OS. This interface is herein defined as "Loop-Back RDP". Using the "Loop-Back RDP" protocol, each of the virtualization devices 104, 108 can access an instance/session of the OS 116 create by the RDP application.

The virtualization module 118, upon USB cable connection, recognizes each newly added virtualization device and automatically creates a registered and licensed instance/session of the OS 116 in a plug-and-play fashion. A unique OS license key is then associated with each of the virtualization devices 104, 108, thereby extending the host computer's 102 OS 116 from just one user to multiple simultaneous users.

A virtualization device driver 120 is used by the virtualization module 118 to communicate with the virtualization devices 104, 108 and thereby drive and receive input from the keyboard 112, microphone 113, mouse 114, and speaker 115. The virtualization device driver 120 includes a display driver for communicating with the display 110.

The virtualization device driver 120 receives display 110, keyboard 112, microphone 113, and mouse 114 input signals over the USB cables 106, 109 and presents the signals as inputs to a corresponding instance/session of the OS 116. The virtualization module 118 creates an instance of the virtualization device driver 120 for each of the virtualization devices 104, 108 connected to the host computer 102.

Figure 2:
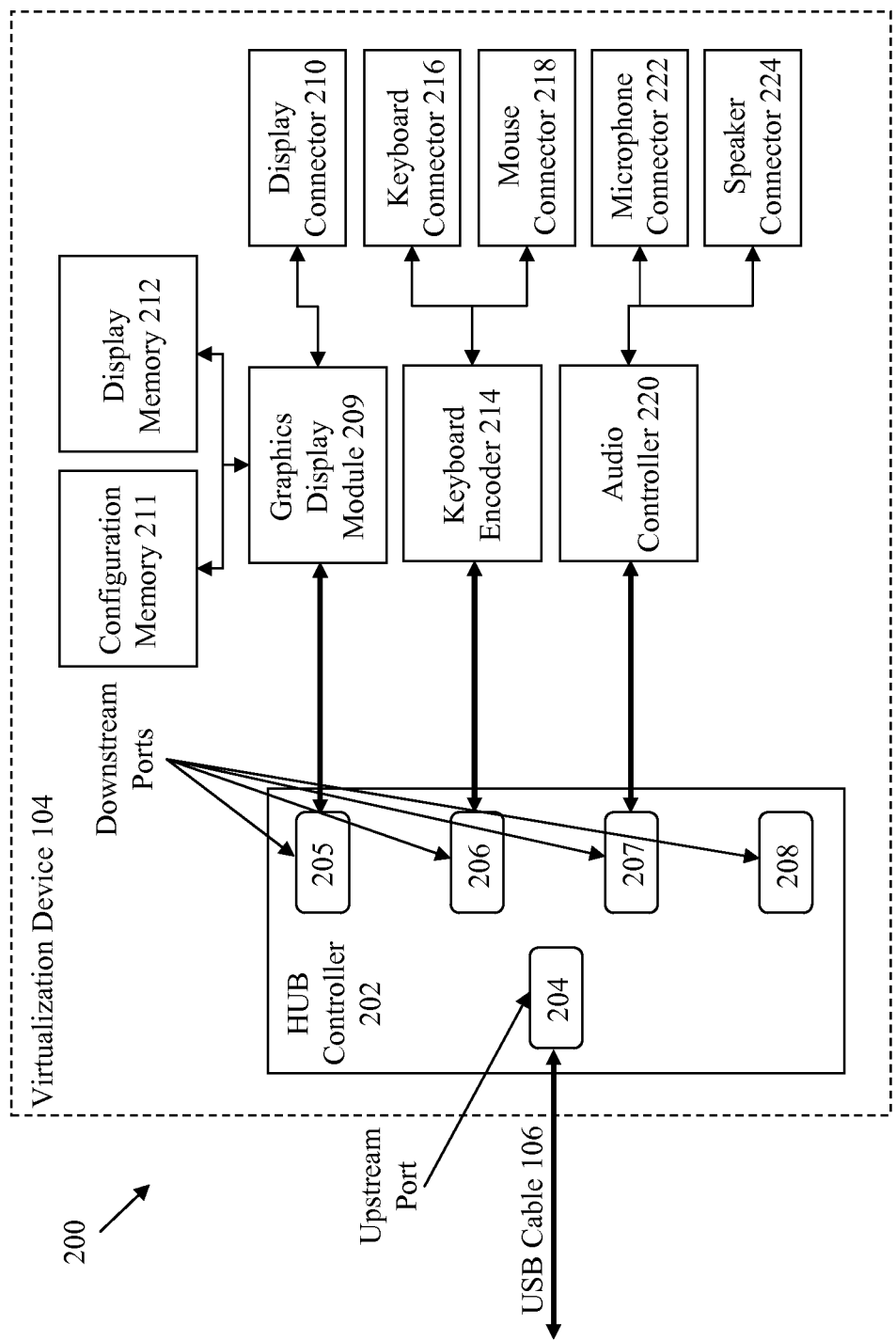
FIG. 2 is first example of a USB powered virtualization device within the system.

FIG. 2 is first example 200 of the virtualization device 104 within the system 100. Power is supplied to the first example 200 of the virtualization device 104 over the USB cable 106. The first example 200 of the virtualization device 104 does not require a separate power supply and thus does not require a separate power cord, thereby simplifying the electronics within the virtualization device 104 and eliminating a need for bulky power cords and power supply infrastructure at the location where the virtualization device 104 is installed.

The first example 200 of the virtualization device 104 includes a hub controller 202. The hub controller 202 is a USB-based multi-port device, such as an SMSC-2514, and includes an upstream port 204 and set of downstream ports 205, 206, 207 and 208. The upstream port 204 is coupled to the host computer 102 by the USB cable 106.

A first downstream port 205 is coupled to a graphics display module 209, which in one example is a USB-based device, such as a DisplayLink-DL125. The graphics display module 209 is coupled to display connector 210, a configuration memory 211, and a display memory 212. The display connector 210 is coupled to the display 110, and is in one example a VGA connector. The graphics display module 209, upon connection to the display 110, automatically identifies the display's 110 attributes and selects a predetermined display size, resolution, and color gamut for the display 110. The graphics display module 209 in combination with the virtualization device driver 120 and the virtualization module 118 appears in one example as would a PCI graphics card to the OS 116 on the host computer 102. The configuration memory 211 stores a set of firmware for the graphics display module 209, and in one example is an Atmel-128 KB-EEPROM device. The display memory 212 is a video memory used by the graphics display module 209 to store images transmitted to the display 110, and in one example is an EtronTech-128 MB-SDRAM device.

A second downstream port 206 is coupled to a keyboard encoder 214, which in one example is a USB-based device, such as a Holtek-Semiconductor-HT82K95E. The keyboard encoder 214 is coupled to a keyboard connector 216 and a mouse connector 218. The keyboard connector 216 is coupled to the keyboard 112, and is in one example a PS2 connector. The mouse connector 218 is coupled to the mouse 114, and is in one example also a PS2 connector. Examples of the invention which use PS2 connectors for the keyboard connector 216 and mouse connector 218 enable the virtualization device 104 to be powered over the B-type-USB cable 106.

Examples of the invention which use USB connectors for the keyboard connector 216 and mouse connector 218 may not be able to meet the USB spec of 500 milliamps per USB connector, but may still be an optional configuration for the invention, depending upon the specific circuitry in the keyboard 112 and mouse 114 included in the system 100. The keyboard encoder 214, in combination with the virtualization device driver 120 and the virtualization module 118, processes signals between the keyboard 112, the mouse 114, and the OS 116, such that the keyboard 112 and the mouse 114 appear to the OS 116 in one example as they would had, had they been directly connected to the host computer 102.

A third downstream port 207 is coupled to an audio controller 220, which in one example is a USB-based device, such as a C-Media-CM119A. The audio controller 220 is coupled to a microphone connector 222 and a speaker connector 224. The microphone connector 222 is coupled to the microphone 113, and is in one example a TRS or RCA connector. The speaker connector 224 is coupled to the speaker 115, and is in one example also a TRS or RCA connector. The audio controller 220, in combination with the virtualization device driver 120 and the virtualization module 118, processes signals between the microphone, the speaker, and the OS 116, such that the microphone and the speaker appear to the OS 116 in one example as they would had, had they been directly connected to the host computer 102.

Figure 3:
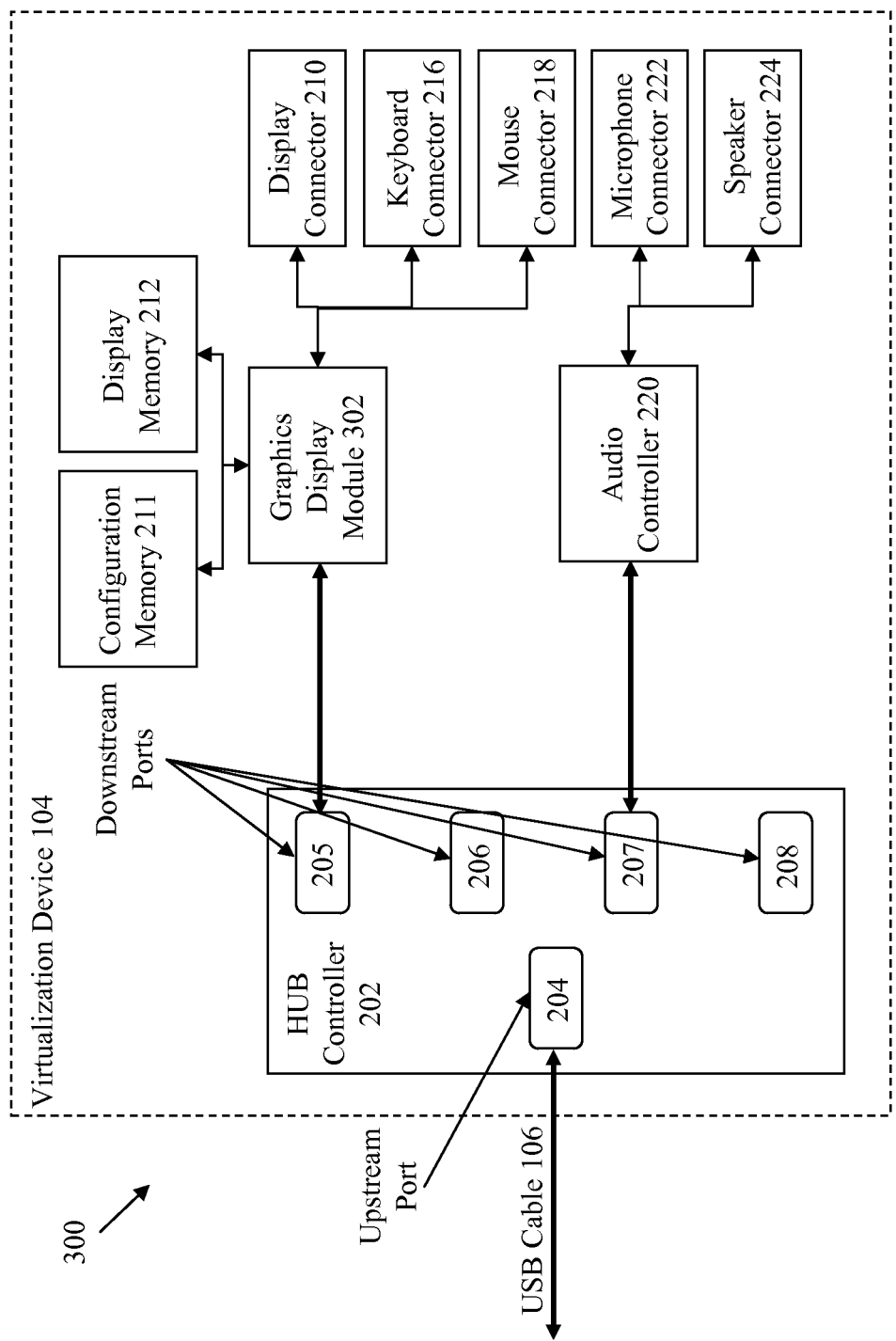
FIG. 3 is second example of a USB powered virtualization device within the system.

FIG. 3 is second example 300 of the virtualization device 104 within the system 100. Power is supplied to the second example 300 of the virtualization device 104 over the USB cable 106. Thus the second example 300 of the virtualization device 104 also does not require a separate power supply. The second example 300 of the virtualization device 104 shares several components with the first example 200 of the virtualization device 104. Only some differences between the first and second examples 200, 300 are now discussed.

In the second example 300, the graphics display module 209 is replaced with a graphics display module 302, and the keyboard encoder 214 is deleted. The first downstream port 205 is thus coupled to the graphics display module 302, which in one example is a USB-based device, such as a DisplayLink-DL125. The graphics display module 302 is coupled to the display connector 210, the configuration memory 211, the display memory 212, the keyboard connector 216 and the mouse connector 218.

The graphics display module 302, upon connection to the keyboard 112 and mouse 114, automatically identifies the keyboard 112 and mouse 114 attributes and selects a predetermined communication protocol for the keyboard 112 and mouse 114. The graphics display module 302 in combination with the virtualization device driver 120 and the virtualization module 118 appears in one example as would a PCI graphics card to the OS 116 on the host computer 102, and processes signals between the keyboard 112, the mouse 114, and the OS 116, such that the keyboard 112 and the mouse 114 appear to the OS 116 as they would had, had they been directly connected to the host computer 102.

Other examples of the USB-only powered virtualization device 104 support a set of USB ports able to supply a sufficient current required to interface with a predetermined set of low-power USB devices. These low-powered USB devices include: thumb-drives, some flash memory devices, and various other self-powered or battery powered devices, such as cameras and video recorders.

Some examples of the virtualization device 104 within the system 100 having separate power supply connectors and circuitry (not shown) are also possible. Such other examples of the virtualization device 104, receive power not only from the USB cable 106, but also from a separate power supply cord, perhaps connected to a wall outlet. If a separate power supply is present, other examples of the virtualization device 104 can supply a USB-spec 500 milliamps to a set of USB ports (not shown).

A set of files refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Instructions of software described above are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. A system for sharing a host computer, comprising:
a set of USB cables having a capacity to transmit power;
a set of virtualization devices, individually coupled, by one of the USB cables, to a corresponding set of USB ports on the host computer, and each receiving power solely from the one of the USB cables;
wherein the host computer further includes:
an operating system; and
a virtualization module which creates an instance of the operating system for each of the virtualization devices; and
wherein at least one of the virtualization devices is further coupled to a display, a keyboard, and a mouse, which interface with the instance of the operating system.

2. The system of claim 1:
wherein one of the virtualization devices includes a graphics display module, which in combination with the virtualization module appears to the operating system as would a PCI graphics card installed on the host computer.

3. The system of claim 1:
wherein one of the virtualization devices includes a keyboard encoder, which in combination with the virtualization module, processes signals between the keyboard, the mouse, and the operating system, such that the keyboard and the mouse appear to the operating system as they would, had they been directly connected to the host computer.

4. The system of claim 1:
further comprising a microphone and a speaker each coupled to the virtualization device; and
wherein one of the virtualization devices includes an audio controller, which in combination with the virtualization module, processes signals between the microphone, the speaker, and the operating system, such that the microphone and the speaker appear to the operating system as they would, had they been directly connected to the host computer.

5. The system of claim 1, wherein:
the virtualization module includes a Remote Desktop Protocol application for creating each instance of the operating system.

6. The system of claim 5, wherein:
the virtualization module further includes a Virtual Network Interface application and a loop-back network stack for creating a simulated network which enables the Remote Desktop Protocol application to interface each instance of the operating system with each corresponding one of the virtualization devices over the USB cables.

7. The system of claim 1, wherein:
the virtualization module automatically recognizes when a new one of the virtualization devices is coupled to the host computer, and in response, creates, registers and licenses the corresponding instance of the operating system.

8. The apparatus of claim 1, wherein:
the virtualization module creates an instance of a virtualization device driver, for enabling each instance of the operating system to communicate with each corresponding one of the virtualization devices.

9. The system of claim 1, wherein the host computer includes no specialized hardware and no PCI circuit cards to couple to the virtualization devices.

10. An apparatus for sharing a host computer, comprising:
a hub controller, having an upstream USB port for receiving USB signals and power from the host computer, and routing the USB signals and power to a set of downstream ports;
a graphics display module coupled to receive the USB signals and power from a first one of the downstream ports, and coupled to a display connector, and in response, output video signals through the display connector;
a keyboard encoder coupled to receive the USB signals and power from a second one of the downstream ports, and coupled to a keyboard connector and a mouse connector, and in response, output USB signals corresponding to input signals from the keyboard connector and a mouse connector;
an audio controller coupled to receive the USB signals and power from a third one of the downstream ports, and coupled to a microphone connector and a speaker connector, and in response, output USB signals corresponding to input signals from the microphone connector, and to output signals to the speaker connector; and
wherein the apparatus receives power only through the upstream USB port.

11. The apparatus of claim 10, further comprising:
a set of USB ports, coupled to receive the USB signals and power from a sub-set of the downstream ports, which can supply a sufficient current required to interface with a predetermined set of USB devices, each of which draws less than 500 milliamps from the USB ports.

12. The apparatus of claim 10, wherein:
the display connector is a VGA connector;
the keyboard connector is a PS2 connector;
the mouse connector is a PS2 connector;
the microphone connector is one from a group of: a TRS or an RCA connector; and
the speaker connector is one from a group of: a TRS or RCA connector.

13. The apparatus of claim 10, wherein:
the graphics display module is to automatically identify the attributes of a display coupled to the graphics display module and select a predetermined display size, resolution, and color gamut for the display.

14. The apparatus of claim 10, wherein:
the graphics display module is further coupled to a configuration memory for storing a set of firmware for the graphics display module, and a display memory is a video memory used by the graphics display module to store image signals for transmission over the display connector.

15. The apparatus of claim 10, wherein:
the configuration memory is an EEPROM device; and
the display memory is an SDRAM device.

16. An apparatus for sharing a host computer, comprising:
a hub controller, having an upstream USB port for receiving USB signals and power from the host computer, and routing the USB signals and power to a set of downstream ports;
a graphics display module coupled to receive the USB signals and power from a first one of the downstream ports, and coupled to a display connector, a keyboard connector and a mouse connector, and in response, output video signals through the display connector, and output USB signals corresponding to input signals from the keyboard connector and a mouse connector;
an audio controller coupled to receive the USB signals and power from a second one of the downstream ports, and coupled to a microphone connector and a speaker connector, and in response, output USB signals corresponding to input signals from the microphone connector, and to output signals to the speaker connector; and
wherein the apparatus receives power only through the upstream USB port.

* * * * *